United States Patent
Xin et al.

(10) Patent No.: US 10,952,214 B2
(45) Date of Patent: Mar. 16, 2021

(54) APPARATUS OF CONFIGURATION ACCORDING TO A RELATIONSHIP BETWEEN CHANNEL BANDWIDTH AND TRANSMISSION BANDWIDTH CONFIGURATION

(71) Applicant: ZTE CORPORATION, Guangdong (CN)

(72) Inventors: Yu Xin, Shenzhen (CN); Wubin Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 110 days.

(21) Appl. No.: 16/399,240

(22) Filed: Apr. 30, 2019

(65) Prior Publication Data

US 2019/0387523 A1    Dec. 19, 2019

Related U.S. Application Data

(63) Continuation of application No. PCT/CN2017/106918, filed on Oct. 19, 2017.

(30) Foreign Application Priority Data

Nov. 4, 2016    (CN) .......................... 201610963740.4

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/001* (2013.01); *H04L 5/0044* (2013.01);
(Continued)

(58) Field of Classification Search
CPC ..... H04W 28/20; H04W 28/26; H04W 72/04; H04W 72/0453; H04W 74/04;
(Continued)

(56) References Cited

U.S. PATENT DOCUMENTS

2010/0246505 A1    9/2010    Chong et al.
2011/0317647 A1*   12/2011   Cho .................... H04L 27/2607
                                                              370/329

(Continued)

FOREIGN PATENT DOCUMENTS

CN    102036401 A    4/2011
CN    102196451 A    9/2011
(Continued)

OTHER PUBLICATIONS

International Search Report (with English Language Translation) and Written Opinion (Chinese Language only) for International Appl. No. PCT/CN2017/106918, dated Jan. 9, 2018.
(Continued)

*Primary Examiner* — Mewale A Ambaye
(74) *Attorney, Agent, or Firm* — Foley & Lardner LLP

(57) ABSTRACT

Provided is a transmission bandwidth configuration method. The method includes: configuring a first channel bandwidth (CB) of a carrier; and in response to determining that the first CB is greater than a first preset bandwidth, configuring subcarriers in a first TBC according to a preset percentage X of the first TBC in the first CB and the first CB, so as to complete a subcarrier configuration in a transmission bandwidth configuration. The preset percentage X is within a range of [a preset lower limit value, a preset upper limit value], the preset lower limit value is greater than 90% and the preset upper limit value is less than 100%. Also provided is a transmitting node.

25 Claims, 8 Drawing Sheets

(51) Int. Cl.
  *H04W 28/20* (2009.01)
  *H04W 28/26* (2009.01)
  *H04L 27/26* (2006.01)

(52) U.S. Cl.
  CPC ......... *H04L 27/2607* (2013.01); *H04W 28/20* (2013.01); *H04W 28/26* (2013.01)

(58) Field of Classification Search
  CPC ....... H04L 5/007; H04L 5/001; H04L 5/0044; H04L 27/2607
  See application file for complete search history.

(56) References Cited

U.S. PATENT DOCUMENTS

| | | | | |
|---|---|---|---|---|
| 2012/0263117 | A1* | 10/2012 | Love | H04L 5/003 370/329 |
| 2013/0017828 | A1* | 1/2013 | Weng | H04W 36/0085 455/434 |
| 2016/0066196 | A1* | 3/2016 | Jiang | H04W 16/14 370/329 |
| 2017/0013581 | A1 | 1/2017 | Dai et al. | |
| 2019/0208482 | A1* | 7/2019 | Tooher | H04L 5/0094 |

FOREIGN PATENT DOCUMENTS

| | | |
|---|---|---|
| CN | 102388591 A | 3/2012 |
| CN | 102480411 A | 5/2012 |
| EP | 2 398 202 A2 | 12/2011 |
| WO | WO-2015-139320 A1 | 9/2015 |

OTHER PUBLICATIONS

Ericsson: "Mixed Numerology in an OFDM System", 3GPP Draft; RI-165833, Cedex, France, May 30, 2016 (May 30, 2016), XP051112002, Retrieved from the Internet: URL:http://www.3gpp.org/ftp/tsg - ran/WGI -RL 1/TSGRI 85/Docs/ [retrieved on May 30, 2016], 9 pages.

Extended European Search Report for EP Appl. No. 17866655.8, dated Jul. 27, 2020, 9 pages.

ZTE: "Discussion on the usable bandwidth for guard-band NB-IOT", 3GPP Draft; R4-160176, St. Julians, Malta; Feb. 14, 2016 (Feb. 14, 2016), XP051056607, Retrieved from the Internet: URL:http://www.3gpp.org/ftp/Meetings_3GPP_SYNC/RAN4/Docs/, [retrieved on Feb. 14, 2016] 3 pages.

Second Chinese Office Action on CN 201610963740.4 dated Jan. 22, 2021 (9 pages).

* cited by examiner

US 10,952,214 B2

APPARATUS OF CONFIGURATION ACCORDING TO A RELATIONSHIP BETWEEN CHANNEL BANDWIDTH AND TRANSMISSION BANDWIDTH CONFIGURATION

CROSS REFERENCE TO RELATED APPLICATIONS

This application claims the benefit of priority under 35 U.S.C. § 120 as a continuation of PCT Patent Application No. PCT/CN2017/106918 filed on Oct. 19, 2017, which claims priority to Chinese patent application No. 201610963740.4 filed on Nov. 4, 2016, the disclosure of each of which is hereby incorporated by reference in its entirety.

TECHNICAL FIELD

The present disclosure relates to transmission technologies in the field of wireless communications and, in particular, to a transmission bandwidth configuration method and a transmitting node.

BACKGROUND

The long term evolution (LTE) technology is a wireless cellular communication technology of the 4th generation mobile communication technology (4G). The LTE uses an orthogonal frequency division multiplexing (OFDM) technology. Wireless physical time-frequency resources of the LTE system are composed of time-frequency resources which are constituted by subcarriers and OFDM symbols. At present, the LTE supports channel bandwidths of six carriers, i.e., 1.4 MHz, 3 MHz, 5 MHz, 10 MHz, 15 MHz and 20 MHz. In a multi-carrier system, the channel bandwidth of the carrier is usually composed of transmission bandwidth configuration (TBC) and a guard band (GB). A maximum proportion of an uplink TBC in a channel bandwidth (CB) of the carrier is 90%, and the remaining 10% is the bandwidth occupied by the GB. However, a downlink TBC may have to additionally consider a size of a direct current subcarrier, the maximum proportion of the TBC thereof is 90.9%, and the remaining 9.1% is the bandwidth occupied by the GB.

SUMMARY

A summary of a subject matter is described hereinafter in detail. This summary is not intended to limit the scope of the appending claims.

Embodiments of the present disclosure provide a transmission bandwidth configuration method and a transmitting node.

Solutions of the embodiments of the present disclosure are implemented as described below.

The embodiments of the present disclosure provide a transmission bandwidth configuration method, applied to a transmitting node, which includes: configuring a first channel bandwidth (CB) of a carrier; and in response to determining that the first CB is greater than a first preset bandwidth, configuring subcarriers in a first transmission bandwidth configuration (TBC) according to a preset percentage X of the first TBC in the first CB and the first CB, to complete a subcarrier configuration in a transmission bandwidth configuration. The preset percentage X is within a range of [a preset lower limit value, a preset upper limit value], the preset lower limit value is greater than 90% and the preset upper limit value is less than 100%.

The embodiments of the present disclosure provide a transmission node, which includes: a configuration device. The configuration device is configured to configure a first CB of a carrier in a multi-carrier transmission system, and in response to determining that the first CB is greater than a first preset bandwidth, configure subcarriers in a first TBC according to a preset percentage X of the first TBC in the first CB and the first CB, so as to complete a subcarrier configuration in a transmission bandwidth configuration. The preset percentage X is within a range of [a preset lower limit value, a preset upper limit value], the preset lower limit value is greater than 90%, and the preset upper limit value is less than 100%.

The embodiments of the present disclosure further provide a transmitting node, which includes: a processor and a storage medium storing processor-executable instructions which, when executed by the processor, execute the following operations.

The processor is configured to configure a first CB of a carrier, and in response to determining that the first CB is greater than a first preset bandwidth, configure subcarriers in a first TBC according to a preset percentage X of the first TBC in the first CB and the first CB, so as to complete a subcarrier configuration in a transmission bandwidth configuration. The preset percentage X is within a range of [a preset lower limit value, a preset upper limit value], the preset lower limit value is greater than 90%, and the preset upper limit value is less than 100%.

The embodiments of the present disclosure provide a transmission bandwidth configuration method, applied to a transmitting node, which includes: configuring a plurality of channel bandwidths (CB) of carriers; configuring a transmission bandwidth configuration (TBC) corresponding to each channel bandwidth (CB), a percentage X of the TBC in the corresponding CB satisfies: as the CB increases, the percentage X of the TBC in the CB monotonically increases.

Moreover, an embodiment of the present disclosure provides a computer-readable storage medium configured to store computer-executable instructions which, when executed by a processor, implement any one of the above-mentioned methods.

A larger bandwidth occupied by the guard band will cause spectrum resource waste. The embodiments of the present disclosure provide a transmission bandwidth configuration method and a transmitting node. The method includes: configuring a first CB of a carrier; and in response to determining that the first CB is greater than a first preset bandwidth, configuring, subcarriers in a first TBC according to a preset percentage X of the first TBC in the first CB and the first CB, so as to complete a subcarrier configuration in a transmission bandwidth configuration. The preset percentage X is within a range of [a preset lower limit value, a preset upper limit value], the preset lower limit value is greater than 90% and the preset upper limit value is less than 100%. With the solutions described above, in the transmission bandwidth configuration method provided by the embodiments of the present disclosure, the transmitting node reduces the bandwidth of the guard band by increasing the bandwidth of the transmission bandwidth configuration. In this way, under the premise of satisfying the out-of-band requirements, not only more data can be transmitted in the limited channel bandwidth to increase a system peak transmission rate, but also spectrum utilization can be improved.

Other aspects can be understood after the drawings and detailed description are read and understood.

DETAILED DESCRIPTION

In the research process of the fifth generation mobile communication technology (5G), a carrier channel bandwidth greater than 20 MHz is introduced. For the carrier channel bandwidth greater than 20 MHz, if a proportion of TBC configured in a CB of the carrier is consistent with a proportion of the TBC configured in an LTE system, although the TCB will increase as the CB of the carrier increases, a bandwidth occupied by a guard band is also very large. Since in 5G wireless communication technology, some new multi-carrier data modulation methods are usually used to suppress out-of-band leakage, and an RF device in 5G technology will adopt more advanced manufacturing process to satisfy out-of-band unwanted emission requirements. So, when out-of-band requirements of the multi-carrier system in the 5G wireless communication technology satisfies the out-of-band unwanted emission requirements, the guard band occupies a large bandwidth, which results the waste of spectrum resources.

The technical solutions of the embodiments of the present disclosure are clearly and completely described below in conjunction with the drawings in the embodiments of the present disclosure.

Example One

Figure 1:
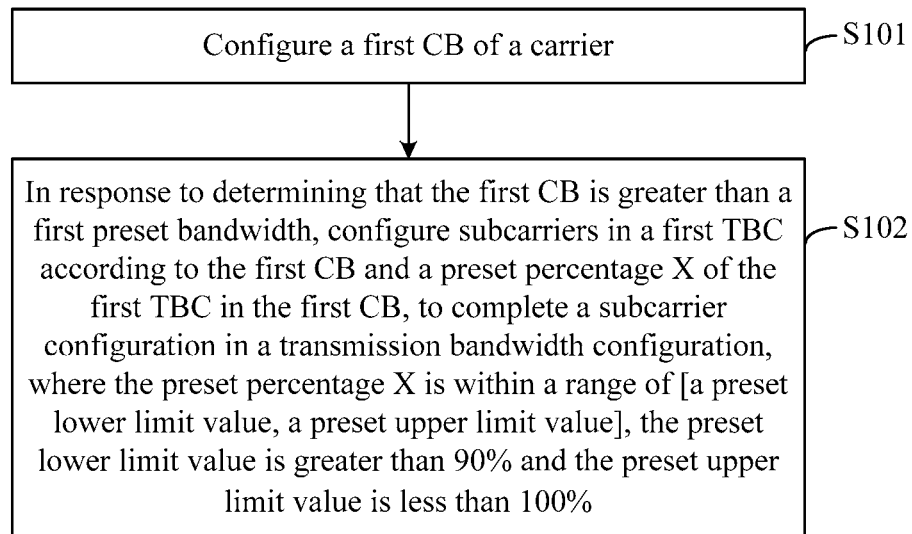
FIG. 1 is flowchart one of a transmission bandwidth configuration method provided by an embodiment of the present disclosure.

The embodiment of the present disclosure provides a transmission bandwidth configuration method. As shown in FIG. 1, the method may include the steps described below.

In step S101, a first CB of a carrier is configured.

In step S102, in response to determining that the first CB is greater than a first preset bandwidth, subcarriers in a first TBC is configured according to the first CB and a preset percentage X1 of the first TBC in the first CB, so as to complete a subcarrier configuration in a transmission bandwidth configuration. A preset percentage X1 is within a range of [a preset lower limit value, a preset upper limit value], the preset lower limit value is greater than 90% and the preset upper limit value is less than 100%, and X1 is determined when the out-of-band unwanted emission requirements is satisfied.

The embodiment of the present disclosure provides a transmission bandwidth configuration method which is applied to a transmitting node in a multi-carrier system. The method is mainly used in a relatively large channel bandwidth, for example, when the channel bandwidth is greater than 20 MHz, it is just required that the channel bandwidth is greater than a preset bandwidth, which is not limited in the embodiments of the present disclosure.

In the embodiment of the present disclosure, the transmitting node of the multi-carrier system may include: a base station, a terminal, a relay, a transmitting point or any other transmitting device.

In the embodiment of the present disclosure, in the multi-carrier transmission system, the transmitting node may support transmissions of various kinds of carriers. Here, the transmitting node may configure a first CB of a carrier, the first CB is a radio frequency bandwidth of the carrier supported by the transmitting node, and the first CB is one channel bandwidth being used in at least one channel bandwidth of the carrier, where the at least one channel bandwidth of the carrier is a channel bandwidth of the carrier supported by the transmitting node. In the embodiment of the present disclosure, a process of transmission bandwidth configuration of one current carrier is illustrated. In response to determining that the first CB is greater than the first preset bandwidth, the transmitting node may configure subcarriers in the first TBC according to the preset percentage X1 of the first TBC in the first CB and the first CB, so as to complete the subcarrier configuration in the transmission bandwidth configuration. A preset percentage X1 is within a range of [a preset lower limit value, a preset upper limit value], the preset lower limit value is greater than 90% and the preset upper limit value is less than 100%. X1 may be determined when the out-of-band unwanted emission requirements are satisfied. The first TBC is a total bandwidth of physical time-frequency resources in a frequency domain in the first CB.

In the embodiment of the present disclosure, the preset lower limit value may be 92%, and the preset upper limit value may be 96%. The first preset bandwidth may be 5 MHz or 20 MHz. In the embodiment of the present disclosure, it is just required that the preset lower limit value is greater than 90% and the preset upper limit value is less than 100%, which are not limited in the embodiment of the present disclosure. At the same time, the size of the preset bandwidth is also not limited in the embodiment of the present disclosure, and an example value of the preset bandwidth satisfies: as subcarrier spacings increase, the first preset bandwidth also increases.

For the multi-carrier system in the embodiment of the present disclosure, the channel bandwidth (the first CB) of the carrier is a radio frequency bandwidth supported by the carrier in the transmitting node in the multi-carrier system and is usually composed of a TBC and a guard band (GB). A center frequency of the channel bandwidth is located at a middle position of the channel bandwidth. In the embodiment of the present disclosure, the TBC is a maximum transmission bandwidth that the transmitting node is able to support within the channel bandwidth of the multi-carrier system. The actual transmission bandwidth (TB) is a frequency bandwidth at which the transmitting node instantaneously transmits data. The size of the transmission bandwidth may be any value, but a maximum value cannot exceed the transmission bandwidth configuration. Therefore, the TBC is greater than or equal to the TB.

Figure 2:
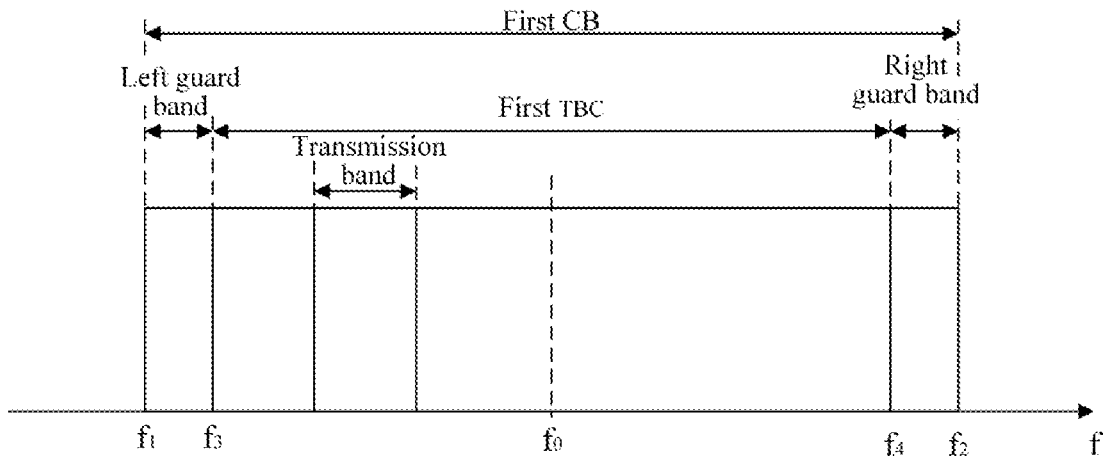
FIG. 2 is a schematic diagram of a frequency spectrum of an example first CB in a transmission bandwidth configuration method provided by an embodiment of the present disclosure.

In one example embodiment, as shown in FIG. 2, the relationship of these frequencies is: $f_2 > f_4 > f_0 > f_3 > f_1$, the first $CB = f_2 - f_1$, and a center frequency $f_0$ of the first CB is $(f_2 + f_1)/2$, the configured first $TBC = f_4 - f_3$, therefore, the first TBC is also defined as a frequency range between the most edges of two available subcarriers allocated at two sides of the first CB respectively.

When the first CB of the carrier of the transmitting node in the multi-carrier system is greater than 20 MHz, the percentage X of the first TBC in the first CB is: X=TBC/CB*100%, and X is within a range of [92%, 96%], i.e., $X = (f_4 - f_3)/(f_2 - f_1) * 100\%$, where the value range of $X$ is [92%,96%].

Figure 3:
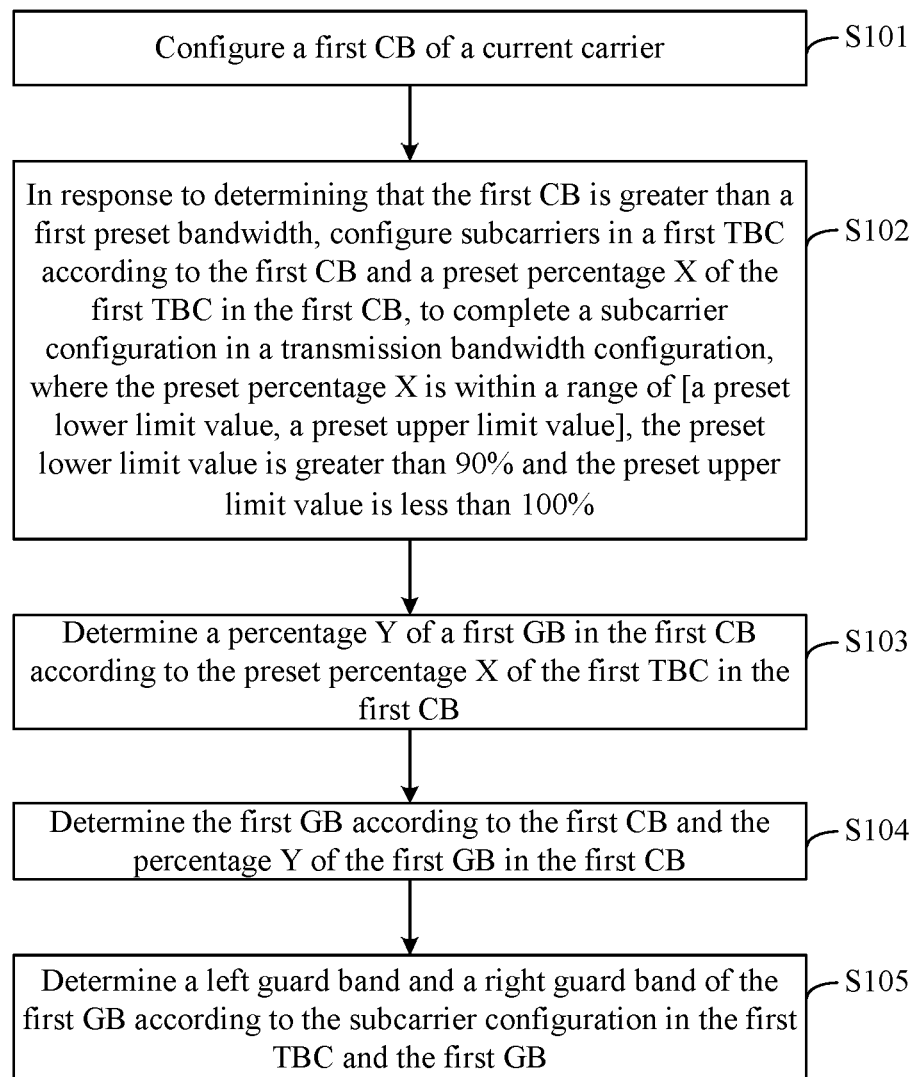
FIG. 3 is flowchart two of a transmission bandwidth configuration method provided by an embodiment of the present disclosure.

In one example embodiment, as shown in FIG. 3, a transmission bandwidth configuration method provided by an embodiment of the present disclosure further includes steps S103 to S105 after the step S102.

In step S103, a percentage Y of a first GB in the first CB is determined according to the preset percentage X of the first TBC in the first CB.

The first CB is composed of the first TBC and the first GB. Therefore, a relationship between the preset percentage X of the first TBC in the first CB and the percentage Y of the first GB in the first CB is: Y=1-X.

In the multi-carrier system, the GB is located outside the TBC and includes two parts: a left guard band and a right guard band; as shown in FIG. 2, a guard band on a left side of the TBC is called as the left guard band, and a guard band on a right side of the TBC is called as the right guard band. In the embodiment, a combination of the left guard band and the right guard band is called the guard band (GB).

In one example embodiment, as shown in FIG. 2, the bandwidth of the left guard band equals $f_3 - f_1$, and the bandwidth of the right guard band equals $f_2 - f_4$. The percentage Y of the first GB in the first CB is: Y=GB/CB*100%=Y=1-X. Therefore, Y is in a range of [4%, 8%], which may be expressed by a formula:

$Y = [(f_3 - f_1) + (f_2 - f_4)]/(f_2 - f_1) * 100\%$, where the value range of $Y$ is [4%,8%].

In step S104, the first GB is determined according to the percentage Y of the first GB in the first CB and the first CB.

After the transmitting node determines the percentage Y of the first GB in the first CB according to the preset percentage X of the first TBC in the first CB, the transmitting node acquires the percentage Y of the first GB in the first CB. Therefore, when the transmitting node acquires the first CB, the transmitting node may calculate a bandwidth occupied by the first GB.

In step S105, the left guard band and the right guard band of the first GB are determined according to the subcarrier configuration in the first TBC and the first GB.

After the transmitting node determines the first GB according to the percentage Y of the first GB in the first CB and the first CB, the transmitting node may determine bandwidth configuration of the first CB according to the subcarrier configuration in the first TBC. Therefore, the first GB may configure the first GB on the left and right sides of the first TBC according to the configuration of the first TBC in the first CB, thereby determining the left guard band and the right guard band of the first GB. In the first CB, the left side of the first TBC is filled to a starting frequency to the first CB, the right side of the first TBC is filled to an ending frequency to the first CB, thereby determining the left guard band and the right guard band of the first GB.

In the embodiment of the present disclosure, the left guard band and the right guard band are symmetric or asymmetric with respect to the center frequency of the first CB. Whether the left guard band and the right guard band of the first GB are symmetric may be determined according to a time-frequency resource configuration of the first TBC. The time-frequency resource configuration of the first TBC in different cases will be described in detail in the subsequent embodiments.

Figure 4:
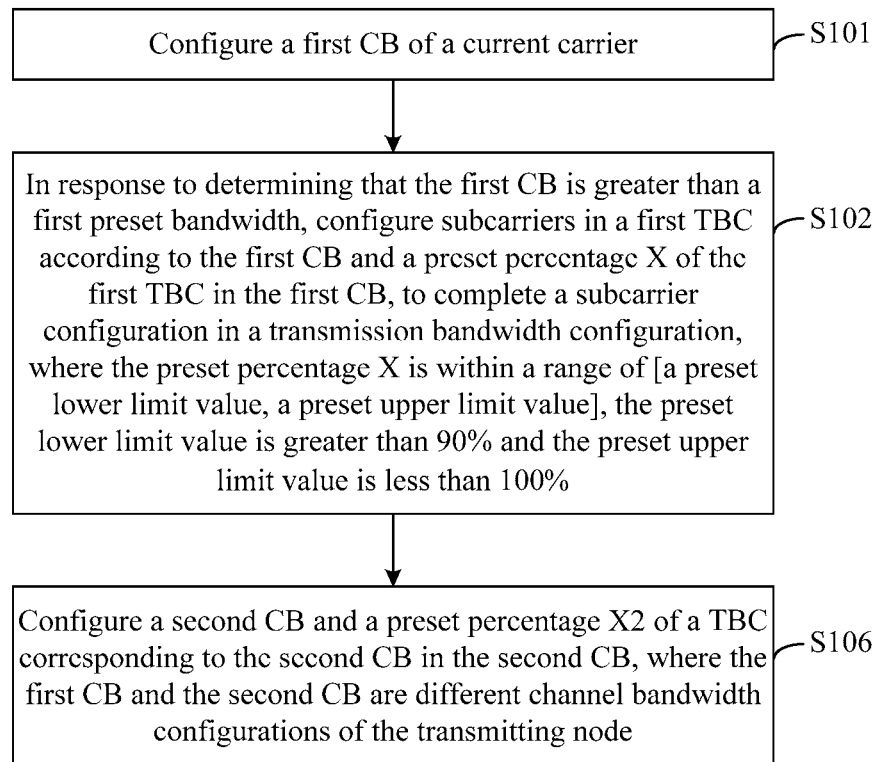
FIG. 4 is flowchart three of a transmission bandwidth configuration method provided by an embodiment of the present disclosure.

In one example embodiment, as shown in FIG. 4, a transmission bandwidth configuration method provided by an embodiment of the present disclosure further includes a step S106 after the step S102.

In step S106, a second CB and a preset percentage X2 of a transmission bandwidth configuration (TBC) corresponding to the second CB in the second CB are configured. The first CB and the second CB are different channel bandwidth configurations of the transmitting node.

The transmitting node may support various kinds of CBs in the multi-carrier system. The principle of a configuration process of the second CB is the same as that of the first CB.

In a case that the transmitting node is able to support multiple kinds of channel bandwidths, when the second CB is greater than the first CB, the preset percentage X2 of the second TBC in the second CB is greater than or equal to the preset percentage X1 of the first TBC in the first CB; or, when the second CB is less than the first CB, the preset percentage X2 of the second TBC in the second CB is less than or equal to the preset percentage X1 of the first TBC in the first CB. That is, when the CB of the carrier supported by the transmitting node increases, the percentage X of the TBC in the CB is monotonically increases. It is assumed that a channel bandwidth CB1 is greater than a channel bandwidth CB2, a proportion of a TBC1 in the CB1 is X1, a proportion of a TBC2 in the CB2 is X2, and X1≥X2 is satisfied. A proportion of a guard band GB1 in the CB1 is Y1, and a proportion of a guard band GB2 in the CB2 is Y2, and Y2≥Y1 is satisfied. When the second CB is less than the first CB, the preset percentage X2 of the second TBC in the second CB is less than or equal to the preset percentage X1 of the first TBC in the first CB.

In the embodiment of the present disclosure, under a condition that, in response to determining that the second CB is greater than the first CB, the preset percentage X2 of the second TBC in the second CB is greater than or equal to the preset percentage X1 of the first TBC in the first CB, the first CB and the second CB may be in a same multi-carrier system or in different multi-carrier systems, which is not limited by the embodiments of the present disclosure.

It is to be understood that in the transmission bandwidth configuration method provided by the embodiments of the present disclosure, the transmitting node reduces the bandwidth of the guard band by increasing the bandwidth of the transmission bandwidth configuration, so that, under the premise of satisfying the out-of-band requirements, not only more data can be transmitted in the limited channel bandwidth to increase a system peak transmission rate, but also spectrum utilization can be improved.

The transmission bandwidth configuration method provided by the embodiments of the present disclosure not only can be compatible with a subcarrier spacing of 15 kHz in an original LTE system, but also can be compatible with other possible subcarrier spacings, thereby having a strong compatibility.

Example Two

Figure 5:
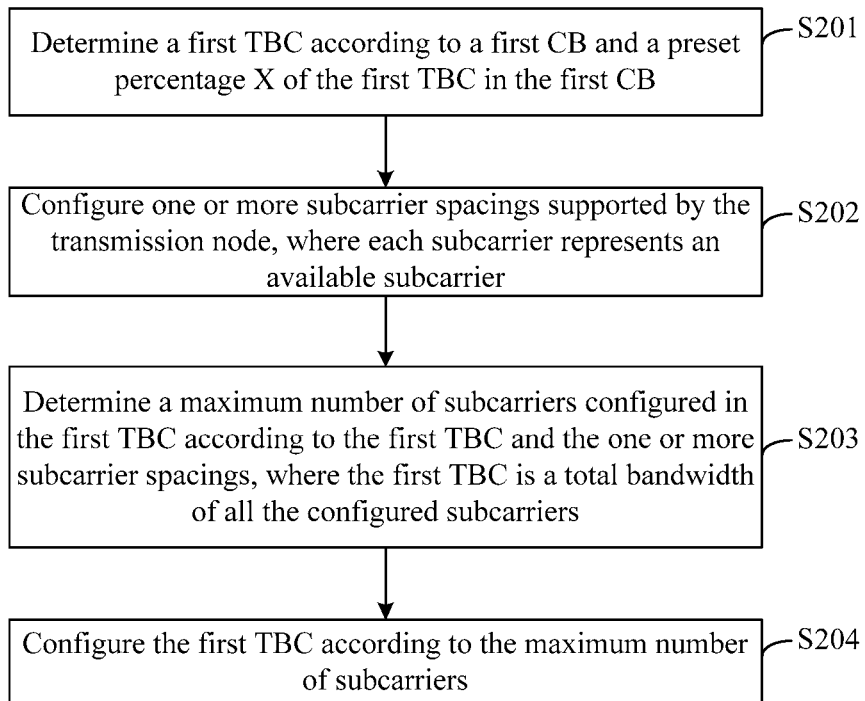
FIG. 5 is flowchart four of a transmission bandwidth configuration method provided by an embodiment of the present disclosure.

Based on the example one, when there is no direct circuit subcarrier to be configured in a first TBC, as shown in FIG. 5, a transmitting node configures subcarriers in the first TBC according to a first CB and a preset percentage X of the first TBC in the first CB through the steps described below.

In step S201, the first TBC is determined according to the first CB and the preset percentage X of the first TBC in the first CB.

The transmitting node acquires the percentage X of the first TBC in the first CB. Therefore, at the time of the transmitting node acquiring the first CB, the transmitting node may calculate a bandwidth occupied by the first TBC.

In step S202, various subcarrier spacings supported by the transmitting node are configured. Each subcarrier represents an available subcarrier.

The transmitting node may support various kinds of subcarriers in the multi-carrier system. Therefore, the transmitting node may configure and determine the various subcarrier spacings.

In step S203, the maximum number of subcarriers configured in the first TBC is determined according to the first TBC and the various subcarrier spacings. The first TBC is a total bandwidth of all the configured subcarriers.

After the transmitting node obtains the various subcarrier spacings supported by the transmitting node, the transmitting node determines which kind or kinds of subcarriers may be selected for configuring the first TBC. Then the transmitting node determines the maximum number of subcarriers configured in the first TBC according to the first TBC and the selected subcarrier spacing(s). The first TBC is the total bandwidth of all the configured subcarriers.

In step S204, the first TBC is configured according to the maximum number of subcarriers.

After the transmitting node determines the maximum number of subcarriers configured in the first TBC according to the first TBC and the various subcarrier spacings, the transmitting node may configure on the first TBC according to the various kinds of subcarriers and the number of the subcarriers to complete the configuration of the first TBC.

When there is no direct circuit subcarrier to be configured in the first TBC and the first TBC configures one kind of subcarriers, the configuration of the first TBC provided by the embodiment of the present disclosure is as follows.

In the embodiment of the present disclosure, for the multi-carrier system composed of multiple consecutive subcarriers, it is assumed that the maximum number of available subcarriers (the maximum number of subcarriers) configured on the first TBC is i, the consecutive subcarriers from left to right are numbered from #1 to #i, and all the i subcarriers transmit data.

It is assumed that time-frequency resources in the first TBC include one subcarrier spacing $\Delta f$, and $\Delta f$ may be 15 kHz in the LTE system or another newly defined subcarrier spacing.

In the embodiment, the first TBC is the total bandwidth of physical time-frequency resources in a frequency domain in the first CB, or the first TBC is a frequency range between the most edges of two available subcarriers allocated at two sides of the first CB respectively. That is, the first TBC=i×$\Delta f$ or the first $$TBC = \sum_{1}^{i} \Delta f.$$

Under the premise of satisfying out-of-band unwanted emission requirements, the maximum number i of the available subcarriers may be configured to make the proportion of the first TBC in the first CB is within the range mentioned in the embodiment of the present disclosure.

The guard bands (the first GB) on both sides outside the first TBC are described as follows.

Figure 6:
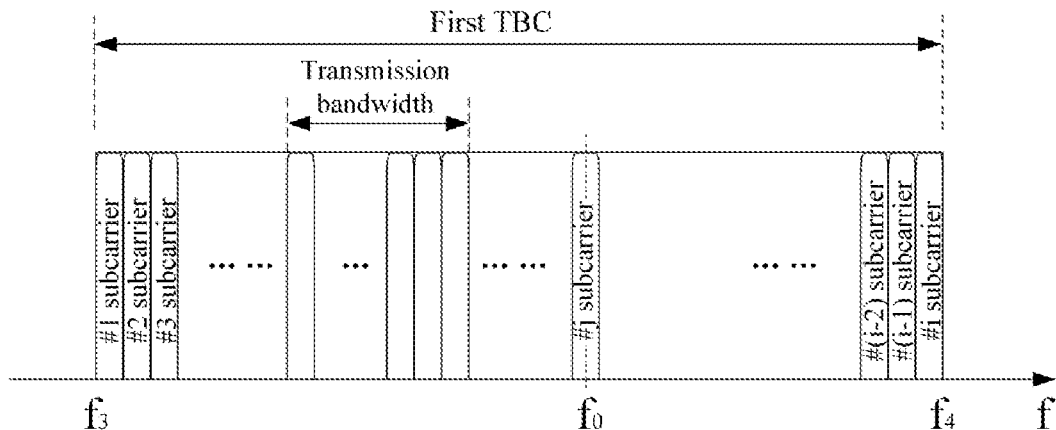
FIG. 6 is schematic diagram one of a frequency spectrum of an example first TBC in a transmission bandwidth configuration method provided by an embodiment of the present disclosure.
Figure 7:
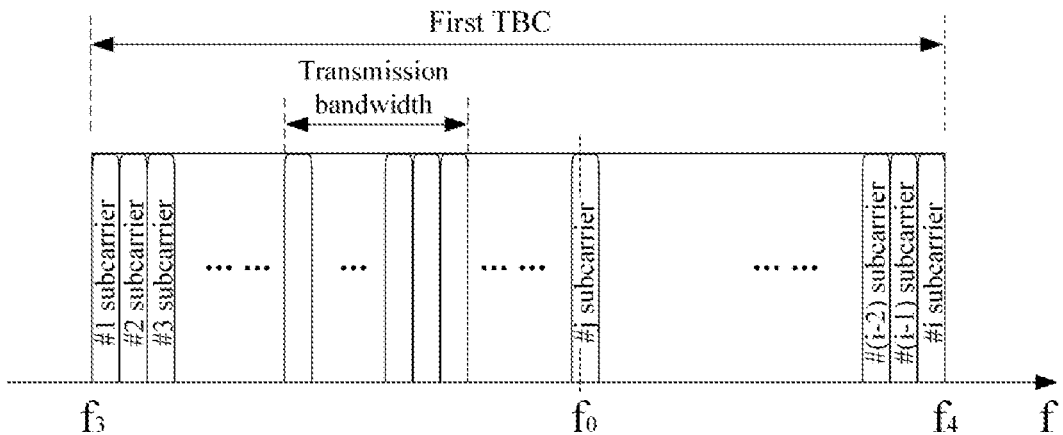
FIG. 7 is schematic diagram two of a frequency spectrum of an example first TBC in a transmission bandwidth configuration method provided by an embodiment of the present disclosure.

As shown in FIG. 6, when j=(i+1)/2 (i is an odd number) and a center frequency of a #$j^{th}$ subcarrier is aligned with a center frequency of a channel bandwidth, a total bandwidth of all (j−1) subcarriers in a number range from #1 to #(j−1) is equal to a total bandwidth of all (i−j) subcarriers in a number range from #(j+1) to #i, then $f_0-f_3=f_4-f_0$, then guard bands on two sides outside the first TBC are symmetric, i.e., $f_3-f_1=f_2-f_4$. When j is any other integer or the center frequency of the #$j^{th}$ subcarrier is not aligned with the center frequency of the first CB, as shown in FIG. 7, the total bandwidth of all (j−1) subcarriers in the number range from #1 to #(j−1) is not equal to the total bandwidth of all (i−j) subcarriers in the number range from #(j+1) to #i, then $f_0-f_3 \neq f_4-f_0$, then the guard bands on two sides outside the first TBC are not symmetric, i.e., $f_3-f_1 \neq f_2-f_4$.

Figure 8:
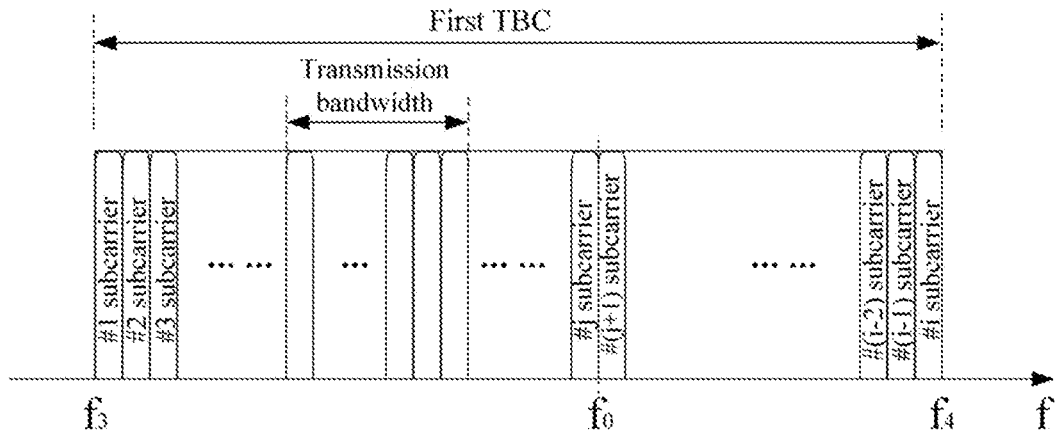
FIG. 8 is schematic diagram three of a frequency spectrum of an example first TBC in a transmission bandwidth configuration method provided by an embodiment of the present disclosure.
Figure 9:
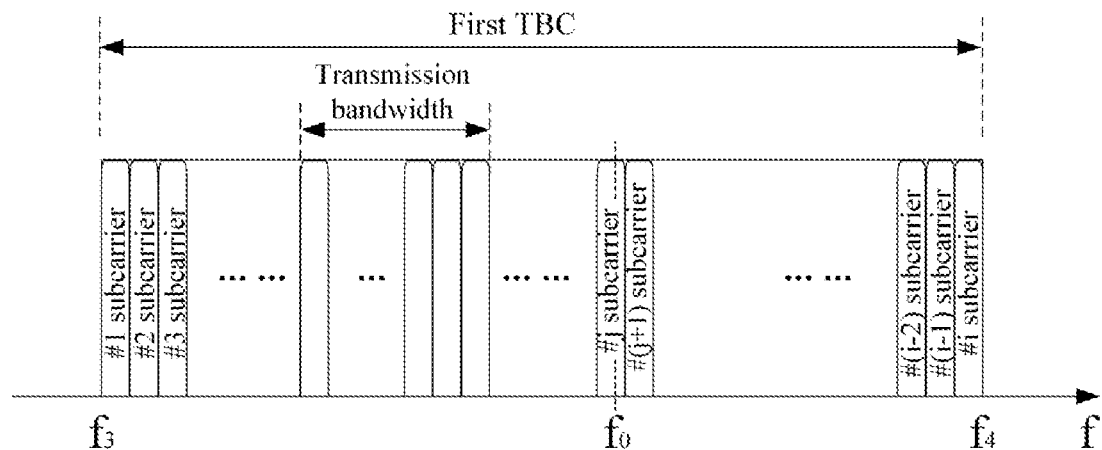
FIG. 9 is schematic diagram four of a frequency spectrum of an example first TBC in a transmission bandwidth configuration method provided by an embodiment of the present disclosure.

As shown in FIG. 8, when j=i/2 (i is an even number) and the #$j^{th}$ subcarrier and a #$(j+1)^{th}$ subcarrier are adjacent to two side of the center frequency of the CB. A total bandwidth of all j subcarriers in a number range from #1 to #j is equal to a total bandwidth of all (i j) subcarriers in a number range from #(j+1) to #i, then $f_0-f_3=f_4-f_0$, then guard bands on two sides outside the first TBC are symmetric, i.e., $f_3-f_1=f_2-f_4$. When j is any other integer or the #$j^{th}$ subcarrier and the #$(j+1)^{th}$ subcarrier are not adjacent to two sides of the center frequency of the CB, as shown in FIG. 9, the total bandwidth of all j subcarriers in the number range from #1 to #j is not equal to the total bandwidth of all (i−j) subcarriers in the number range from #(j+1) to #i, then $f_0-f_3 \neq f_4-f_0$, then the guard bands on two sides outside the first TBC are not symmetric, i.e., $f_3-f_1 \neq f_2-f_4$.

When there is no direct circuit subcarrier to be configured in the first TBC and the first TBC configures multiple kinds of subcarriers, the configuration of the first TBC provided by the embodiment of the present disclosure is as follows.

In the embodiment, for the multi-carrier system composed of multiple consecutive subcarriers, the maximum number of available subcarriers configured on the first TBC is i, the consecutive subcarriers are numbered from #1 to #i from left to right, and all i subcarriers transmit data.

Figure 10:
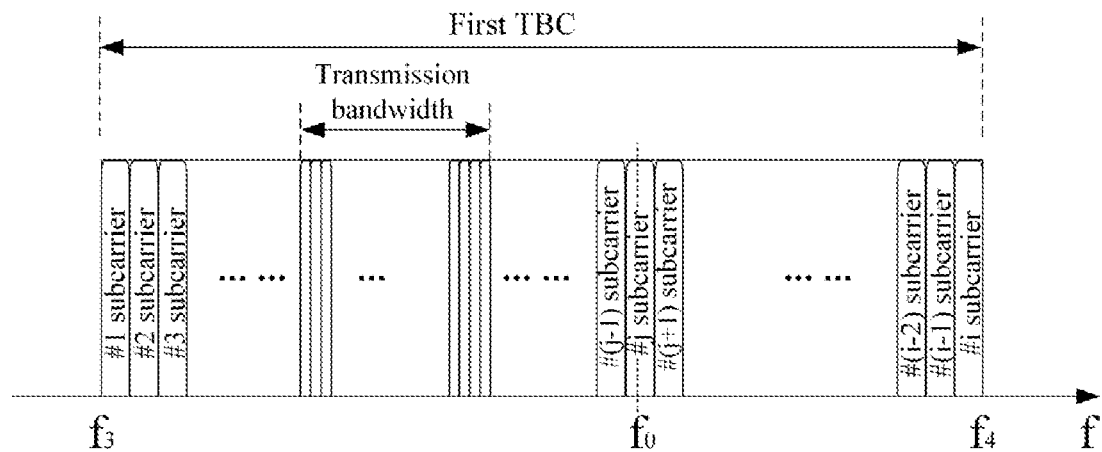
FIG. 10 is schematic diagram five of a frequency spectrum of an example first TBC in a transmission bandwidth configuration method provided by an embodiment of the present disclosure.

As shown in FIG. 10, it is assumed that time-frequency resources in the first TBC include various kinds of subcarrier spacings $\Delta f$, and $\Delta f$ may be 15 kHz in the LTE system, or be other newly defined subcarrier spacings. The center frequency of the #$j^{th}$ subcarrier may be unaligned with the center frequency of the CB or the center frequency of the first CB. All (j−1) subcarriers in the number range from #1 to #(j−1) may support one or more subcarrier spacings, also all (i j) subcarriers in the number range from #(j+1) to #i may support one or more subcarrier spacings, and all i subcarriers support at least two kinds of subcarrier spacings.

In one embodiment, the first TBC is a frequency range from a left edge of the #$1^{th}$ subcarrier to a right edge of the #$i^{th}$ subcarrier, i.e., the first TBC equals $$\sum_{k=1}^{i} \Delta f_k,$$

where $\Delta f_k$ is a $k^{th}$ subcarrier spacing. Under the premise of satisfying out-of-band unwanted emission requirements, through configuring the maximum number of available subcarriers i by the transmitting node, the proportion of the first TBC in the first CB is within the range mentioned in the embodiment of the present disclosure.

For the left and right guard bands of the first GB outside the first TBC, through configuring subcarriers with different bandwidths and the number of subcarriers with different bandwidths, 1) if $f_0-f_3=f_4-f_0$, then the left and right guard bands of the first GB outside the first TBC are symmetric, i.e., $f_3-f_1=f_2-f_4$;

2) if $f_0-f_3 \neq f_4-f_0$, then the left and right guard bands of the first GB outside the first TBC are not symmetric, i.e., $f_3-f_1 \neq f_2-f_4$.

The embodiments of the present disclosure will be described below in detail through experiments.

In the traditional LTE multi-carrier system, using LTE uplink as an example, there is no direct current subcarrier in LTE uplink configuration, and the maximum proportion of the first TBC in the first CB is 90%. Taking the maximum channel bandwidth of 20 MHz supported by the LTE system as an example, the supported maximum number i of subcarriers is i=1200, and the spacings $\Delta f$ between every adjacent subcarriers are equal, i.e., $\Delta f$=15 kHz. Then the first TBC=i*$\Delta f$=18 MHz, the left and right guard bands of the first GB outside the first TBC are symmetric, and each of the left and right guard bands is 1 MHz, satisfying the out-of-band unwanted emission requirements in LTE protocols.

In the research process of millimeter wave communication which is one of 5G technologies, a carrier channel bandwidth greater than 20 MHz is introduced, and other new-defined subcarrier spacings may be supported. It is assumed that the CB of the carriers supported by the transmitting node in the 5G multi-carrier system equals 100 MHz. If the transmission bandwidth configuration method in the traditional LTE multi-carrier system is adopted, the TBC equals 90 MHz. With the transmission bandwidth configuration method in the embodiment of the present disclosure, a value range of X is [92%, 96%], and a value range of the first TBC is [92 MHz, 96 MHz].

1. In a case that the multi-carrier system supports only one subcarrier spacing, and the subcarrier spacing $\Delta f$ is equal to a subcarrier spacing of LTE, i.e., $\Delta f$=15 kHz.

a) According to the transmission bandwidth configuration method in the traditional LTE multi-carrier system, in the channel bandwidth of 100 MHz, the supported maximum number I of subcarriers is i=90 MHz/$\Delta f$=6000, and the guard bands on two sides outside the transmission bandwidth configuration are symmetric.

b) Using the transmission bandwidth configuration method in the multi-carrier system in the embodiment of the present disclosure, in the channel bandwidth of 100 MHz, under the premise of satisfying the out-of-band unwanted emission requirements, the maximum number i of subcarriers may be configured within a range of (6133, 6400], so that 96 MHz≥i*15 kHz≥92 MHz, i.e., the proportion of the first TBC in the first CB is within the range mentioned in the embodiment of the present disclosure. At the same time, through configuring placing positions of all i subcarriers within the channel bandwidth, the guard bands of the first GB at the left and right sides outside the first TBC may be symmetrical or asymmetric.

2. In a case that the multi-carrier system supports one (e.g., only one) subcarrier spacing, and $\Delta f$ is equal to another newly defined subcarrier spacing, such as $\Delta f$=30 kHz.

a) According to the transmission bandwidth configuration method in the traditional LTE multi-carrier system, in the channel bandwidth of 100 MHz, the supported maximum number i of subcarriers is i=90 MHz/$\Delta f$=3000, and the guard bands, on the left and right sides, of the first GB are symmetric.

b) Using the transmission bandwidth configuration method in the multi-carrier system in the embodiment of the present disclosure, in the channel bandwidth of 100 MHz, under the premise of satisfying the out-of-band unwanted emission requirements, the maximum number i of subcarriers may be configured within a range of (3066, 3200], so that 96 MHz≥i*30 kHz≥92 MHz, i.e., the proportion of the first TBC in the first CB is within the range mentioned in the embodiment of the present disclosure. At the same time, through configuring placing positions of all i subcarriers within the first CB, the guard bands of the first GB, which are at the left and right sides respectively and outside the first TBC, may be symmetrical or asymmetric.

3. In a case that the system supports various subcarrier spacings, such as supporting two kinds of subcarrier spacings, $\Delta f1$=15 kHz and $\Delta f2$=30 kHz.

a) According to the transmission bandwidth configuration method in the traditional LTE multi-carrier system, it is assumed that the numbers of subcarriers are $a_1$ and $a_2$ corresponding to the subcarrier spacings $\Delta f1$ and $\Delta f2$ respectively. In the channel bandwidth of 100 MHz, $a_1$*15 kHz+$a_2$*30 kHz=90 MHz, and the guard bands of the first GB, which are at the left and right sides respectively and outside the first TBC, are symmetric.

b) Using the transmission bandwidth configuration method in the multi-carrier system in the embodiment of the present disclosure, it is assumed that the numbers of subcarriers are $b_1$ and $b_2$ corresponding to the subcarrier spacings $\Delta f1$ and $\Delta f2$ respectively. In the channel bandwidth of 100 MHz, under the premise of satisfying the out-of-band unwanted emission requirements, through configuring the numbers of subcarriers corresponding to different subcarrier spacings, 96 MHz≥$b_1$*15 kHz+$b_2$*30 kHz≥92 MHz, i.e., the proportion of the first TBC in the first CB is within the range mentioned in the embodiment of the present disclosure. At the same time, through configuring placing positions of different $b_1$ and $b_2$ as well as all subcarriers within the first CB, the guard bands of the first GB, which are at the left and right sides respectively and outside the first TBC may be symmetrical or asymmetric.

It is to be understood that, in the transmission bandwidth configuration method provided by the embodiments of the present disclosure, the transmitting node reduces the bandwidth size of the guard band by increasing the bandwidth size of the transmission bandwidth configuration. In this way, under the premise of satisfying the out-of-band requirements, not only more data can be transmitted in the limited channel bandwidth to increase the system peak transmission rate, but also spectrum utilization can be improved.

The transmission bandwidth configuration method provided by the embodiment of the present disclosure not only can be compatible with a subcarrier spacing of 15 kHz in the original LTE system, but also can be compatible with other possible subcarrier spacings, which has a strong compatibility.

Example Three

Figure 11:
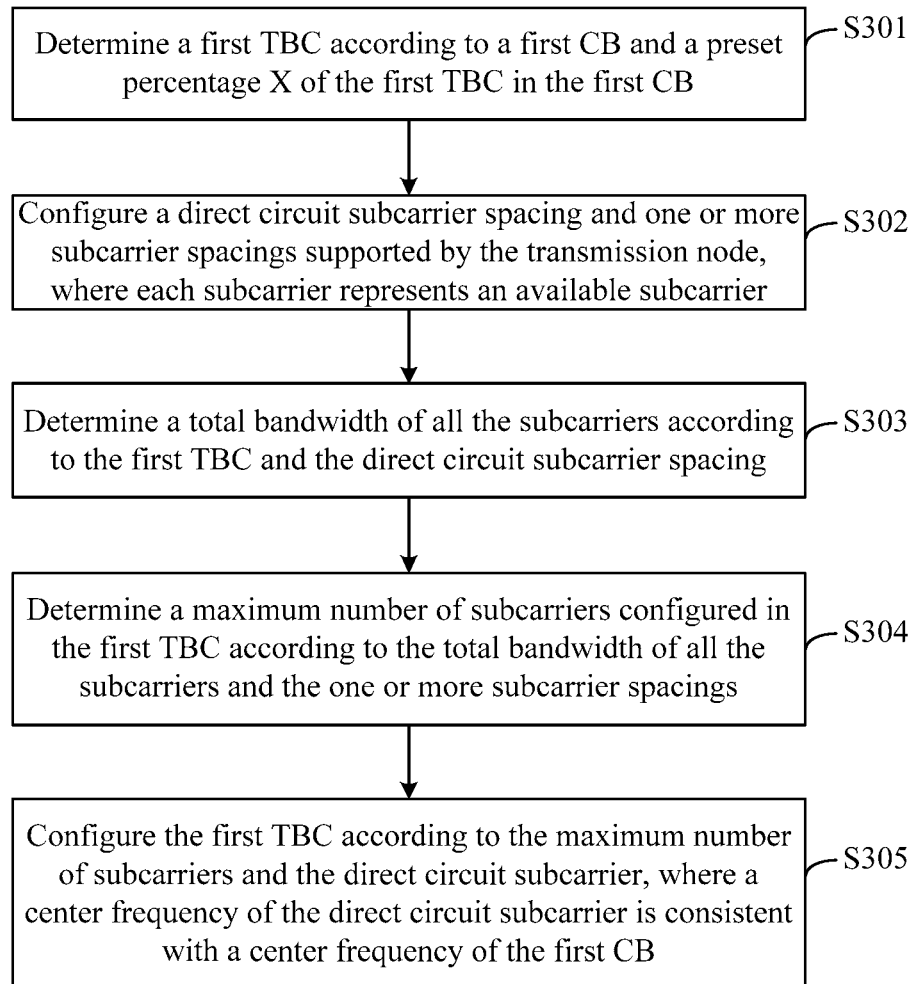
FIG. 11 is flowchart five of a transmission bandwidth configuration method provided by an embodiment of the present disclosure.

Based on the example one, when there is a direct circuit subcarrier to be configured in a first TBC, as shown in FIG. 11, a transmitting node configures subcarriers in the first TBC according to a first CB and a preset percentage X of the first TBC in the first CB through the steps described below.

In step S301, the first TBC is determined according to the first CB and the preset percentage X of the first TBC in the first CB.

The transmitting node acquires the percentage X of the first TBC in the first CB. Therefore, when the transmitting node acquires the first CB, the transmitting node may calculate a bandwidth occupied by the first TBC.

In step S302, one or more subcarrier spacings and a direct circuit subcarrier spacing supported by the transmitting node are configured, and each subcarrier represents an available subcarrier.

The transmitting node may support multiple kinds of subcarriers in the multi-carrier system. Therefore, the transmitting node may configure to determine one or more subcarrier spacings. In the embodiment of the present disclosure, there is the direct circuit subcarrier to be configured in the first TBC, the direct circuit subcarrier does not transmit any data and is located in the middle of the first CB, and a center frequency of the direct circuit subcarrier is aligned with a center frequency of the first CB.

In step S303, a total bandwidth of all the subcarriers is determined according to the first TBC and the direct circuit subcarrier spacing.

After the transmitting node configures the one or more subcarrier spacings supported by the transmitting node, the transmitting node subtracts the direct circuit subcarrier spacing from the first TBC to obtain the total bandwidth of all the subcarriers.

In step S304, the maximum number of subcarriers configured in the first TBC is determined according to the total bandwidth of all the subcarriers and the one or more subcarrier spacings.

After the transmitting node configures the total bandwidth of all the subcarriers supported by the transmitting node, the transmitting node determines which kind or kinds of subcarriers may be selected for configuring the first TBC, then the transmitting node determines the maximum number of subcarriers configured in the first TBC according to the first TBC and the selected subcarrier spacing(s).

In step S305, the first TBC is configured according to the maximum number of subcarriers and the direct circuit subcarrier. The center frequency of the direct circuit subcarrier is consistent with the center frequency of the first CB.

The transmitting node determines the maximum number of subcarriers configured in the first TBC according to the first TBC and the subcarrier spacing(s), and then the transmitting node may configure on the first TBC according to various subcarriers and the number of each of the various subcarriers to complete the configuration of the first TBC.

When there is the direct circuit subcarrier to be configured in the first TBC and the first TBC configures one kind of subcarriers, the configuration of the first TBC provided by the embodiment of the present disclosure is as follows.

In this embodiment, it is assumed that the multi-carrier system, in which the CB of the carrier supported by the transmitting node is greater than 20 MHz, includes the direct circuit subcarrier, the direct circuit subcarrier does not transmit any data and is located in the middle of the channel bandwidth, the center frequency of the direct circuit subcarrier is aligned with the center frequency of the first CB.

Figure 12:
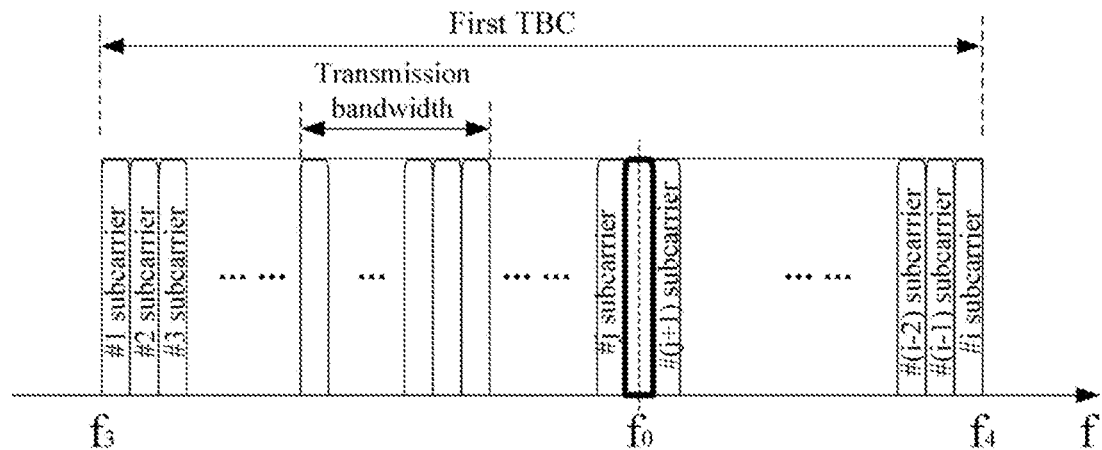
FIG. 12 is schematic diagram six of a frequency spectrum of an example first TBC in a transmission bandwidth configuration method provided by an embodiment of the present disclosure.

As shown in FIG. 12, for the multi-carrier system composed of multiple consecutive subcarriers, the maximum number of available subcarriers configured by the first TBC is i, the consecutive subcarriers from left to right are numbered from #1 to #i, and the #$j^{th}$ subcarrier and the #$(j+1)^{th}$ subcarrier are adjacent to both sides of the direct circuit subcarrier.

It is assumed that time-frequency resources in the first TBC support one (e.g., only one) subcarrier spacing $\Delta f$, and the direct circuit subcarrier spacing is $\Delta f_{DC}$. The $\Delta f$ and $\Delta f_{DC}$ may be 15 kHz in the LTE system, or be other new-defined subcarrier spacings.

In the embodiment, the first TBC is a frequency range from the left edge of the #$1^{th}$ subcarrier to the right edge of the #$i^{th}$ subcarrier, including the direct circuit subcarriers, i.e., the first TBC equals $i \times \Delta f + \Delta f_{DC}$ or $$\sum_{1}^{i} \Delta f + \Delta f_{DC}.$$

Under the premise of satisfying the out-of-band unwanted emission requirements, through configuring the maximum number of available subcarriers i, the proportion of the first TBC in the first CB is within the range mentioned in the embodiment of the present disclosure.

For left and right guard bands of the first GB outside the first TBC, the following two illustrations are included.

When i is an odd number, a total bandwidth of all j subcarriers in a number range from #1 to #j is not equal to a total bandwidth of all (i−j) subcarriers in a number range from #(j+1) to #i, then $f_0 - f_3 \neq f_4 - f_0$, and the left and right guard bands outside the first TBC are not symmetric, i.e., $f_3 - f_1 \neq f_2 - f_4$.

When i is an even number and j=i/2, the total bandwidth of all j subcarriers in the number range from #1 to #j is equal to the total bandwidth of all (i−j) subcarriers in the number range from #(j+1) to #i, then $f_0 - f_3 = f_4 - f_0$, and the guard bands on two sides outside the first TBC are symmetric, i.e., $f_3 - f_1 = f_2 - f_4$. When j is another arbitrary integer, the total bandwidth of all j subcarriers in the number range from #1 to #j is not equal to the total bandwidth of all (i–j) subcarriers in the number range from #(j+1) to #i, then $f_0-f_3\neq f_4-f_0$, and the left and right guard bands outside the first TBC are not symmetric, i.e., $f_3-f_1\neq f_2-f_4$.

When there is the direct circuit subcarrier to be configured in the first TBC and the first TBC configures multiple kinds of subcarriers, the configuration of the first TBC provided by the embodiment of the present disclosure is as follows.

In the embodiment, it is assumed that the multi-carrier system, in which the first CB of the carrier supported by the transmitting node is greater than 20 MHz, includes the direct circuit subcarrier, the direct circuit subcarrier does not transmit any data and is located in the middle of the channel bandwidth, and the center frequency of the direct circuit subcarrier is aligned with the center frequency of the first CB.

Figure 13:
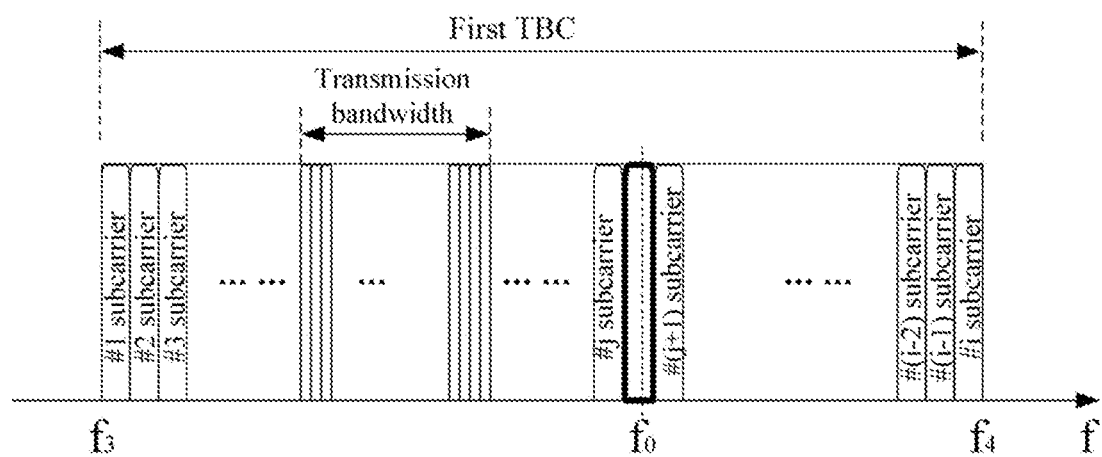
FIG. 13 is schematic diagram seven of a frequency spectrum of an example first TBC in a transmission bandwidth configuration method provided by an embodiment of the present disclosure.

As shown in FIG. 13, for the multi-carrier system composed of multiple consecutive subcarriers, the maximum number of available subcarriers configured by the first TBC is i, the consecutive subcarriers from left to right are numbered from #1 to #i, and the #j$^{th}$ subcarrier and the #(j+1)$^{th}$ subcarrier are adjacent to both sides of the direct circuit subcarrier.

It is assumed that time-frequency resources in the first TBC support multiple kinds of subcarrier spacings $\Delta f$, and the direct circuit subcarrier spacing is $\Delta f_{DC}$. The $\Delta f$ and $\Delta f_{DC}$ may be 15 kHz in the LTE system, or be other new-defined subcarrier spacings.

In the embodiment, the first TBC is a frequency range from the left edge of the #1$^{th}$ subcarrier to the right edge of the #i$^{th}$ subcarrier which includes the direct circuit subcarrier, i.e., the first TBC equals $$\sum_{k=1}^{i} \Delta f_k + \Delta f_{DC},$$

where $\Delta f_k$ is a k$^{th}$ subcarrier spacing. Under the premise of satisfying the out-of-band unwanted emission requirements, through configuring the numbers of subcarriers corresponding to different subcarrier spacings, the proportion of the first TBC in the first CB is within the range mentioned in the embodiment of the present disclosure.

All j subcarriers in the number range from #1 to #j may support one or more subcarrier spacings, while all (i–j) subcarriers in the number range from #(j+1) to #i may support one or more subcarrier spacings, and all i subcarriers support at least two kinds of subcarrier spacings.

It is assumed that all j subcarriers in the number range from #1 to #j support N subcarrier spacings, which respectively are $\Delta f_{N1}, \Delta f_{N2}, \ldots, \Delta f_{NN}$. The number of corresponding subcarriers respectively are $a_{N1}, a_{N2}, \ldots, a_{NN}$, and $a_{N1}+a_{N2}+\ldots a_{NN}=j$ is satisfied. Additionally, it is assumed that all (i–j) subcarriers in the number range from #(j+1) to #i support M subcarrier spacings, which respectively are $\Delta f_{M1}, \Delta f_{M2}, \ldots, \Delta f_{MM}$. The number of corresponding subcarriers respectively are $b_{M1}, b_{M2}, \ldots, b_{MM}$, and $b_{M1}+b_{M2}+\ldots b_{MM}=i-j$ is satisfied.

So, the total bandwidth of all j subcarriers in the number range from #1 to #j is:

$$f_0 - f_3 - \Delta f_{DC}/2 = \sum_{1}^{a_{N1}} \Delta f_{N1} + \sum_{1}^{a_{N2}} \Delta f_{N2} + \ldots \sum_{1}^{a_{NN}} \Delta f_{NN},$$

and the total bandwidth of all (i–j) subcarriers in the number range from #(j+1) to #i is:

$$f_4 - f_0 - \Delta f_{DC}/2 = \sum_{1}^{b_{M1}} \Delta f_{M1} + \sum_{1}^{b_{M2}} \Delta f_{M2} + \ldots \sum_{1}^{b_{MM}} \Delta f_{MM}.$$

For the left and right guard bands of the first GB outside the first TBC, the following parameters may be properly configured: different subcarrier spacings $\Delta f_{N1}, \Delta f_{N2}, \ldots, \Delta f_{NN}$ and $\Delta f_{M1}, \Delta f_{M2}, \Delta f_{MM}$, and the number of corresponding subcarriers $a_{N1}, a_{N2}, \ldots, a_{NN}$ and $b_{M1}, b_{M2}, \ldots, b_{MM}$.

1. If $f_0-f_3=f_4-f_0$ is satisfied, the total bandwidth of all j subcarriers in the number range from #1 to #j is equal to the total bandwidth of all (i–j) subcarriers in the number range from #(j+1) to #i, then the left and right guard bands outside the first TBC are symmetric, i.e., $f_3-f_1=f_2-f_4$.

2. If $f_0-f_3\neq f_4-f_0$ is satisfied, the total bandwidth of all j subcarriers in the number range from #1 to #j is not equal to the total bandwidth of all (i–j) subcarriers in the number range from #(j+1) to #i, then the left and right guard bands outside the first TBC are not symmetric, i.e., $f_3-f_1\neq f_2-f_4$.

It is to be understood that in the transmission bandwidth configuration method provided by the embodiments of the present disclosure, the transmitting node reduces the bandwidth size of the guard band by increasing the bandwidth size of the transmission bandwidth configuration, in this way, under the premise of satisfying the out-of-band requirements, not only more data can be transmitted in the limited channel bandwidth to increasing the system peak rate, but also the spectrum utilization can be improved.

The transmission bandwidth configuration method provided by the embodiment of the present disclosure not only can be compatible with a subcarrier spacing of 15 kHz in the original LTE system, but also can be compatible with other possible subcarrier spacings, which has a strong compatibility.

Example Four

Figure 14:
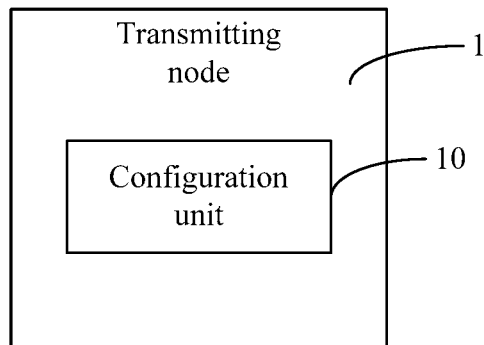
FIG. 14 is structural diagram one of a transmitting node according to an embodiment of the present disclosure.

As shown in FIG. 14, the embodiment of the present disclosure provides a transmitting node 1. The transmitting node 1 may include a configuration device 10. The configuration device 10 is configured to configure a first CB of a carrier in a multi-carrier transmission system; and in response to determining that the first CB is greater than a first preset bandwidth, configure subcarriers in a first TBC according to the first CB and a preset percentage X1 of the first TBC in the first CB so as to complete a subcarrier configuration in a transmission bandwidth configuration. The preset percentage X1 is within a range of [a preset lower limit value, a preset upper limit value], the preset lower limit value is greater than 90%, and the preset upper limit value is less than 100%.

Figure 15:
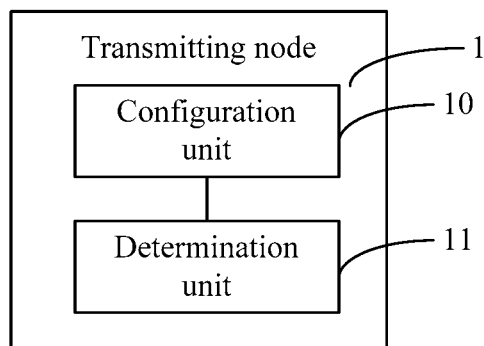
FIG. 15 is structural diagram two of a transmitting node according to an embodiment of the present disclosure.

In the embodiment of the present disclosure, as shown in FIG. 15, the transmitting node may further include a determination device 11.

The determination device is configured to, in response to determining that there is no direct circuit subcarrier to be configured in the first TBC, determine the first TBC according to the first CB and the preset percentage X1 of the first TBC in the first CB.

The configuration device 10 is configured to configure one or more subcarrier spacings supported by the transmitting node. Each subcarrier represents an available subcarrier.

The determination device 11 is further configured to determine a maximum number of subcarriers configured in the first TBC according to the first TBC and the one or more subcarrier spacings, where the first TBC is a total bandwidth of all the configured subcarriers.

The configuration device 10 is further configured to configure the first TBC according to the maximum number of subcarriers.

In the embodiment of the present disclosure, as shown in FIG. 15, the transmitting node may further include a determination device 11.

The determination device 11 is configured to, in response to determining that there is a direct circuit subcarrier to be configured in the first TBC, determine the first TBC according to the preset percentage X1 of the first TBC in the first CB and the first CB.

The configuration device 10 is configured to acquire one or more subcarrier spacings and a direct circuit subcarrier spacing supported by the transmitting node. Each subcarrier represents an available subcarrier.

The determination device 11 is further configured to determine a total bandwidth of all the subcarriers according to the first TBC and the direct circuit subcarrier spacing; and determine the maximum number of subcarriers configured in the first TBC according to the total bandwidth of all the subcarriers and the one or more subcarrier spacings.

The configuration device 10 is further configured to configure the first TBC according to the maximum number of subcarriers and the direct circuit subcarrier. A center frequency of the direct circuit subcarrier is consistent with a center frequency of the first CB.

In the embodiment of the present disclosure, as shown in FIG. 15, the transmitting node may further include a determination device 11.

The determination device 11 is configured to, after acquiring the first CB of the carrier, determine a percentage Y of a first GB in the first CB according to the preset percentage X1 of the first TBC in the first CB; and determine the first GB according to the percentage Y of the first GB in the first CB and the first CB.

In the embodiment of the present disclosure, the determination device 11 may further be configured to, according to the subcarrier configuration in the first TBC and the first GB, determine a left guard band and a right guard band of the first GB after configuring the subcarriers in the first TBC according to the preset percentage X1 of the first TBC in the first CB and the first CB.

In the embodiment of the present disclosure, the left guard band and the right guard band are symmetric or asymmetric with respect to the center frequency of the first CB.

In the embodiment of the present disclosure, the configuration device 10 may also be configured to configure the subcarriers in the first TBC according to the preset percentage X1 of the first TBC in the first CB and the first CB; and configure a second CB and a preset percentage X2 of a second TBC in the second CB and configure subcarriers in the second TBC. The first CB and the second CB are different channel bandwidth configurations of the transmitting node.

In the embodiment of the present disclosure, in response to determining that the second CB is greater than the first CB, the preset percentage X2 of the second TBC in the second CB is greater than or equal to the preset percentage X1 of the first TBC in the first CB.

In the embodiment of the present disclosure, the first CB may be a radio frequency bandwidth of the carrier supported by the transmitting node, the first CB may be one channel bandwidth being used in channel bandwidths of at least one carrier, and the channel bandwidths of at least one carrier may be channel bandwidths of the carriers supported by the transmitting node.

The first TBC is a total bandwidth of physical time-frequency resources in a frequency domain in the first CB, or the first TBC is a frequency range between the most edges of available subcarriers allocated at two sides of the first CB.

In the embodiment of the present disclosure, the preset lower limit value may be 92% and the preset upper limit value may be 96%, where X1 is determined when an out-of-band unwanted emission requirements condition is satisfied.

Figure 16:
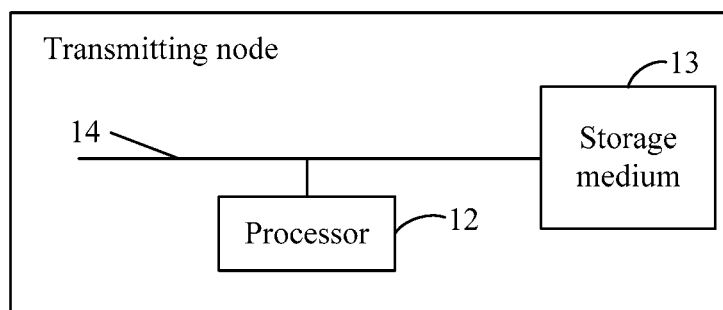
FIG. 16 is structural diagram three of a transmitting node according to an embodiment of the present disclosure.

As shown in FIG. 16, in practical applications, the determination device 11 and the configuration device 10 may be implemented by a processor 12 located on the transmitting node, such as a central processing device (CPU), a microprocessor device (MPU), a digital signal processor (DSP), a field programmable gate array (FPGA), or the like. The transmitting node further includes: a storage medium 13, which may be connected to the processor 12 through a system bus 14. The storage medium 13 is configured to store executable program codes which include computer program instructions. The storage medium 13 may include a high-speed RAM memory, and may also include a non-volatile memory, such as at least one disk memory.

In the embodiment of the present disclosure, the transmitting node of the multi-carrier system may include: a base station, a terminal, a relay, a transmitting point or other transmitting devices.

The embodiments of the present disclosure further provide a transmitting node, which includes: a processor and a storage medium storing processor-executable instructions which, when executed by the processor, execute the following operations.

The processor is configured to configure a first CB of a carrier, and in response to determining that the first CB is greater than a first preset bandwidth, configure subcarriers in a first TBC according to the first CB and a preset percentage X1 of the first TBC in the first CB so as to complete a subcarrier configuration in a transmission bandwidth configuration. The preset percentage X1 is within a range of [a preset lower limit value, a preset upper limit value], the preset lower limit value is greater than 90%, and the preset upper limit value is less than 100%, and X1 is determined when the out-of-band unwanted emission requirements is satisfied.

In the embodiment of the present disclosure, the processor may further be configured to, in response to determining that there is no direct circuit subcarrier to be configured in the first TBC, determine the first TBC according to the preset percentage X1 of the first TBC in the first CB and the first CB; and configure one or more subcarrier spacings supported by the transmitting node, where each subcarrier represents an available subcarrier; and determine a maximum number of subcarriers configured in the first TBC according to the first TBC and the one or more subcarrier spacings, where the first TBC is a total bandwidth of all the configured subcarriers; and configure the first TBC according to the maximum number of subcarriers.

In the embodiment of the present disclosure, the processor may also be configured to, in response to determining that there is a direct circuit subcarrier to be configured in the first TBC, determine the first TBC according to the preset percentage X1 of the first TBC in the first CB and the first CB; and configure one or more subcarrier spacings and a direct circuit subcarrier spacing supported by the transmitting node, where each subcarrier represents an available subcarrier; and determine a total bandwidth of all the subcarriers according to the first TBC and the direct circuit subcarrier spacing; determine the maximum number of subcarriers configured in the first TBC according to the total bandwidth of all the subcarriers and the one or more subcarrier spacings; and configure the first TBC according to the maximum number of subcarriers and the direct circuit subcarrier, where a center frequency of the direct circuit subcarrier is consistent with a center frequency of the first CB.

In the embodiment of the present disclosure, the processor may also be configured to determine, after configuring the first CB of the carrier, a percentage Y of a first GB in the first CB according to the preset percentage X1 of the first TBC in the first CB; and determine the first GB according to the percentage Y of the first GB in the first CB and the first CB.

In the embodiment of the present disclosure, the processor may further be configured to, after configuring the subcarriers in the first TBC according to the preset percentage X1 of the first TBC in the first CB and the first CB, determine a left guard band and a right guard band of the first GB according to the subcarrier configuration in the first TBC and the first GB.

In the embodiment of the present disclosure, the left guard band and the right guard band may be symmetric or asymmetric with respect to the center frequency of the first CB.

In the embodiment of the present disclosure, the processor may further be configured to configure the subcarriers in the first TBC according to the first CB and the preset percentage X1 of the first TBC in the first CB; and configure a second CB and a preset percentage X2 of a TBC, which corresponds to the second CB, in the second CB, and configure subcarriers in the second TBC. The first CB and the second CB are different channel bandwidth configurations of the transmitting node.

In the embodiment of the present disclosure, in response to determining that the second CB is greater than the first CB, the preset percentage X2 of the second TBC in the second CB may be greater than or equal to the preset percentage X1 of the first TBC in the first CB.

In the embodiment of the present disclosure, the first CB may be a radio frequency bandwidth of the carrier supported by the transmitting node, the first CB may be one channel bandwidth being used in channel bandwidths of at least one carrier, and the channel bandwidths of at least one carrier may be channel bandwidths of the carriers supported by the transmitting node.

The first TBC is a total bandwidth of physical time-frequency resources in a frequency domain in the first CB, or the first TBC is a frequency range between the most edges of available subcarriers allocated at two sides of the first CB.

In the embodiment of the present disclosure, the preset lower limit value is 92% and the preset upper limit value is 96%, where X1 is determined when an out-of-band unwanted emission requirements condition is satisfied.

Moreover, the embodiment of the present disclosure provides a computer-readable storage medium configured to store computer-executable instructions which, when executed by a processor, implement any one of the above-mentioned methods.

It is to be understood that, in the transmission bandwidth configuration method provided by the embodiments of the present disclosure, the transmitting node reduces the bandwidth size of the guard band by increasing the bandwidth size of the transmission bandwidth configuration, in this way, under the premise of satisfying the out-of-band leakage requirements, not only more data can be transmitted in the limited channel bandwidth to increase the system peak transmission rate, but also the spectrum utilization can be improved.

It should be understood by those skilled in the art that functional modules/devices in all or part of the steps of the method, the system and the device disclosed above may be implemented as software, firmware, hardware and appropriate combinations thereof. In the hardware implementation, division of the functional modules/devices mentioned in the above description may not correspond to division of physical components. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storage, a magnetic cassette, a magnetic tape, a magnetic disk storage or other magnetic storage devices, or any other medium used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

The above are only example embodiments of the present disclosure and are not intended to limit the scope of the present disclosure.

INDUSTRIAL APPLICABILITY

Embodiments of the present disclosure provide a transmission bandwidth configuration method and a transmitting node. The method includes: configuring a first channel bandwidth (CB) of a carrier; and, in response to determining that the first CB is greater than a first preset bandwidth, configuring subcarriers in a first TBC according to the first CB and a preset percentage X of the TBC in the first CB so as to complete a subcarrier configuration in a transmission bandwidth configuration. The preset percentage X is within a range of [a preset lower limit value, a preset upper limit value], the preset lower limit value is greater than 90% and the preset upper limit value is less than 100%. With the solutions described above, in the transmission bandwidth configuration method provided by the embodiments of the present disclosure, the transmitting node reduces the bandwidth of the guard band by increasing the bandwidth of the transmission bandwidth configuration. In this way, under the premise of satisfying out-of-band leakage requirements, not only more data can be transmitted in the limited channel bandwidth to increase the system peak transmission rate, but also the spectrum utilization can be improved. Therefore, the present disclosure has industrial applicability.

What is claimed is:

1. A bandwidth configuration method, comprising:
configuring a first channel bandwidth (CB) of a first carrier, a first transmission bandwidth configuration (TBC) corresponding to the first CB, and a first subcarrier configuration, according to a first predefined relationship between the first CB and the first TBC;
configuring a first guard band and a second guard band in the first CB that are located on sides of the first TBC, respectively, wherein the first and second guard bands are asymmetric with respect to a center frequency of the first CB; and
transmitting data using a frequency bandwidth according to the first TBC,
wherein the first CB is greater than a preset bandwidth, and
wherein the first predefined relationship between the first CB and the first TBC includes a first percentage of the first CB that the first TBC occupies, the first percentage greater than 90% and less than 100%.

2. The bandwidth configuration method of claim 1, wherein the preset bandwidth increases as a subcarrier spacing, configured by the first subcarrier configuration, increases.

3. The bandwidth configuration method of claim 1, wherein the first percentage monotonically increases with the first CB.

4. The bandwidth configuration method of claim 1, wherein the first percentage is between 92% and 96%.

5. The bandwidth configuration method of claim 1, further comprising:
configuring a second CB of the first carrier and a second TBC corresponding to the second CB according to a second predefined relationship between the second CB and the second TBC; and
transmitting the data using a frequency bandwidth according to the second TBC,
wherein the second CB is greater than the first CB,
wherein the second predefined relationship includes a second percentage that the second TBC occupies the second CB, the second percentage greater than the first percentage.

6. The bandwidth configuration method of claim 1, further comprising:
configuring a second CB of a second carrier and a second TBC corresponding to the second CB according to a second predefined relationship between the second CB and the second TBC; and
transmitting the data using a frequency bandwidth according to the second TBC,
wherein the second CB is greater than the first CB,
wherein the second predefined relationship includes a second percentage that the second TBC occupies the second CB, the second percentage greater than the first percentage.

7. The bandwidth configuration method of claim 1, further comprising:
configuring a second CB of a second carrier and a second TBC corresponding to the second CB according to a second predefined relationship between the second CB and the second TBC; and
transmitting the data using a frequency bandwidth according to the second TBC,
wherein the second CB is less than the first CB,
wherein the second predefined relationship includes a second percentage that the second TBC occupies the second CB, the second percentage less than the first percentage.

8. A wireless communications apparatus comprising: a processor configured to implement:
configuring a first channel bandwidth (CB) of a first carrier, a first transmission bandwidth configuration (TBC) corresponding to the first CB, and a first subcarrier configuration, according to a first predefined relationship between the first CB and the first TBC;
configuring a first guard band and a second guard band in the first CB that are located on sides of the first TBC, respectively, wherein the first and second guard bands are asymmetric with respect to a center frequency of the first CB; and
transmitting data using a frequency bandwidth according to the first TBC,
wherein the first CB is greater than a preset bandwidth, and
wherein the first predefined relationship between the first CB and the first TBC includes a first percentage of the first CB that the first TBC occupies, the first percentage greater than 90% and less than 100%.

9. The wireless communications apparatus of claim 8, wherein the preset bandwidth increases as a subcarrier spacing, configured by the first subcarrier configuration, increases.

10. The wireless communications apparatus of claim 8, wherein the first percentage monotonically increases with the first CB.

11. The wireless communications apparatus of claim 8, wherein the processor is configured to implement:
configuring a second CB of the first carrier and a second TBC corresponding to the second CB according to a second predefined relationship between the second CB and the second TBC; and
transmitting the data using a frequency bandwidth according to the second TBC,
wherein the second CB is greater than the first CB,
wherein the second predefined relationship includes a second percentage that the second TBC occupies the second CB, the second percentage greater than the first percentage.

12. The wireless communications apparatus of claim 8, wherein the processor is configured to implement:
configuring a second CB of a second carrier and a second TBC corresponding to the second CB according to a second predefined relationship between the second CB and the second TBC; and
transmitting the data using a frequency bandwidth according to the second TBC,
wherein the second CB is greater than the first CB,
wherein the second predefined relationship includes a second percentage that the second TBC occupies the second CB, the second percentage greater than the first percentage.

13. A bandwidth configuration method, comprising:
acquiring a first channel bandwidth (CB) of a first carrier, a first transmission bandwidth configuration (TBC) corresponding to the first CB, and a first subcarrier configuration, according to a first predefined relationship between the first CB and the first TBC; and
acquiring configuration of a first guard band and a second guard band in the first CB that are located on sides of the first TBC, respectively, wherein the first and second guard bands are asymmetric with respect to a center frequency of the first CB;

wherein the first CB is greater than a preset bandwidth, and wherein the first predefined relationship between the first CB and the first TBC includes a first percentage of the first CB that the first TBC occupies, the first percentage greater than 90% and less than 100%.

14. The bandwidth configuration method of claim 13, wherein the preset bandwidth increases as a subcarrier spacing, configured by the first subcarrier configuration, increases.

15. The bandwidth configuration method of claim 13, wherein the first percentage monotonically increases with the first CB.

16. The bandwidth configuration method of claim 13, wherein the first percentage is between 92% and 96%.

17. The bandwidth configuration method of claim 13, further comprising:

acquiring a second CB of the first carrier and a second transmission bandwidth configuration TBC corresponding to the second CB according to a second predefined relationship between the second CB and the second TBC, wherein the second CB is greater than the first CB, wherein the second predefined relationship includes a second percentage that the second TBC occupies the second CB, the second percentage greater than the first percentage.

18. The bandwidth configuration method of claim 13, further comprising:

acquiring a second CB of a second carrier and a second transmission bandwidth configuration TBC corresponding to the second CB according to a second predefined relationship between the second CB and the second TBC, wherein the second CB is greater than the first CB, wherein the second predefined relationship includes a second percentage that the second TBC occupies the second CB, the second percentage greater than the first percentage.

19. The bandwidth configuration method of claim 13, further comprising:

acquiring a second CB of a second carrier and a second transmission bandwidth configuration TBC corresponding to the second CB according to a second predefined relationship between the second CB and the second TBC, wherein the second CB is smaller than the first CB, wherein the second predefined relationship includes a second percentage that the second TBC occupies the second CB, the second percentage greater than the first percentage.

20. A wireless communications apparatus comprising: a processor configured to implement:

acquiring a first channel bandwidth (CB) of a first carrier, a first transmission bandwidth configuration (TBC) corresponding to the first CB, and a first subcarrier configuration, according to a first predefined relationship between the first CB and the first TBC; and acquiring configuration of a first guard band and a second guard band in the first CB that are located on sides of the first TBC, respectively, wherein the first and second guard bands are asymmetric with respect to a center frequency of the first CB;

wherein the first CB is greater than a preset bandwidth, and wherein the first predefined relationship between the first CB and the first TBC includes a first percentage of the first CB that the first TBC occupies, the first percentage greater than 90% and less than 100%.

21. The wireless communications apparatus of claim 20, wherein the preset bandwidth increases as a subcarrier spacing, configured by the first subcarrier configuration, increases.

22. The wireless communications apparatus of claim 20, wherein the first percentage monotonically increases with the first CB.

23. The wireless communications apparatus of claim 20, wherein the first percentage is between 92% and 96%.

24. The wireless communications apparatus of claim 20, wherein the processor is configured to implement:

acquiring a second CB of the first carrier and a second transmission bandwidth configuration TBC corresponding to the second CB according to a second predefined relationship between the second CB and the second TBC, wherein the second CB is greater than the first CB, wherein the second predefined relationship includes a second percentage that the second TBC occupies the second CB, the second percentage greater than the first percentage.

25. The wireless communications apparatus of claim 20, wherein the processor is configured to implement:

acquiring a second CB of a second carrier and a second transmission bandwidth configuration TBC corresponding to the second CB according to a second predefined relationship between the second CB and the second TBC, wherein the second CB is greater than the first CB, wherein the second predefined relationship includes a second percentage that the second TBC occupies the second CB, the second percentage greater than the first percentage.

* * * * *

UNITED STATES PATENT AND TRADEMARK OFFICE
CERTIFICATE OF CORRECTION

PATENT NO. : 10,952,214 B2  
APPLICATION NO. : 16/399240  
DATED : March 16, 2021  
INVENTOR(S) : Yu Xin and Wubin Zhou Page 1 of 1

It is certified that error appears in the above-identified patent and that said Letters Patent is hereby corrected as shown below:

In the Claims

Claim 17, at Column 21, Line 19, please delete "transmission bandwidth configuration"

Claim 18, at Column 21, Line 31, please delete "transmission bandwidth configuration"

Claim 19, at Column 21, Line 43, please delete "transmission bandwidth configuration", and at Column 21, Lines 50-51, please delete "the second percentage greater than the first percentage" and replace with – the second percentage less than the first percentage –

Claim 24, at Column 22, Line 31, please delete "transmission bandwidth configuration"

Claim 25, at Column 22, Line 43, please delete "transmission bandwidth configuration"

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*